United States Patent [19]
Ikegami

[11] 3,913,858
[45] Oct. 21, 1975

[54] APPARATUS FOR DISPOSING OF A WIRE TERMINAL IN A WIRE WINDING MACHINE

[75] Inventor: Yoshio Ikegami, Kobe, Japan

[73] Assignee: Kobe Steel, Ltd., Kobe, Japan

[22] Filed: Dec. 28, 1973

[21] Appl. No.: 429,690

[30] Foreign Application Priority Data
Dec. 28, 1972  Japan................................. 48-4794

[52] U.S. Cl............................................. 242/25 A
[51] Int. Cl.².......................................... B65H 67/04
[58] Field of Search......................... 242/25 A, 18 A

[56] References Cited
UNITED STATES PATENTS

| | | | |
|---|---|---|---|
| 3,621,190 | 11/1971 | Morikawa et al............. | 242/25 A X |
| 3,693,898 | 9/1972 | Otani................................ | 242/25 A |
| 3,698,652 | 10/1972 | Morikawa et al................ | 242/25 A |
| 3,761,030 | 9/1973 | Leinonen et al.................. | 242/25 A |

*Primary Examiner*—Stanley N. Gilreath
*Attorney, Agent, or Firm*—Oblon, Fisher, Spivak, McCelland & Maier

[57] ABSTRACT

Apparatus for disposing of the terminal end of a wound wire in a wire winding machine includes a wire shifting rod movable between two bobbins disposed in parallel fashion, a cover attached to the wire shifting rod which serves to cover the wound bobbin, and a cutter attached to the cover. The cutter severs the terminal end of the wire into chips which are prevented from splashing due to the confinement within the cover and the tension required to sever the terminal end portion of the wire also prevents the occurrence of slack within the wound wire. Auxiliary covers may be attached to to the wire shifting rod and an auxiliary rod and an air nozzle may forcefully dispose of the generated chips.

7 Claims, 4 Drawing Figures

APPARATUS FOR DISPOSING OF A WIRE TERMINAL IN A WIRE WINDING MACHINE

BACKGROUND OF THE INVENTION

1. Field of the Invention:

The present invention relates generally to wire winding apparatus and more particularly to apparatus for disposing of a wire end terminal in a wire winding machine which continuously winds such wires, such as for example, electric wires, by alternately utilizing two bobbins rotatably disposed in parallel fashion.

2. Description of the Prior Art:

Wire winding machines which continuously wind wires by alternately utilizing two bobbins disposed in parallel fashion are of course known. For example, U.S. Pat. No. 3,693,898 discloses a method for the continuous winding of wire and apparatus for accomplishing the same. Wire winding machines having two bobbins disposed in parallel, however, exhibit operational problems in that the free end terminal of the wire wound upon the fully wound or completed bobbin tends to whip therearound causing damage to the wire wound or being wound upon such bobbin. In addition, such end terminal causes additional operational problems within the apparatus due to the fact that such free end terminal of the wire tends to whip everything disposed about or adjacent the fully wound bobbin including the wire subsequently being wound upon the empty bobbin positioned at the other side of the apparatus, such whipping action even causing the wire winding apparatus to cease operation.

In other prior art apparatus, the fully wound bobbin has been covered with a suitable casing or cover, and while such a cover could serve to protect the wire disposed exteriorly of the cover from the harmful whipping of the wound wire terminal end, the terminal end nevertheless continues to whip around within the cover causing further damage to the wire wound upon the fully wound bobbin and also causes operational snags necessitating shutdown of the apparatus.

Attempts have also been made to fix the terminal end upon the fully wound bobbin by means of injecting adhesive thereon. However, such adhesive fixing of the terminal exhibits substantial difficulty since the adhesive is subjected to the effects of centrifugal force due to the high rotational speed of the fully wound bobbin and consequently precise injection of adhesive to the rapidly rotating terminal end is virtually impossible.

SUMMARY OF THE INVENTION

Accordingly, it is an object of the present invention to provide an apparatus for disposing of the wire end terminal so as to protect the wire already wound upon the fully wound bobbin and also being wound upon the empty bobbin from any damage due to the whipping action of the terminal end.

Another object of the present invention is to dispose of the terminal end of the wire without interfering with the transfer of the bobbin windings or with the flow path of the wires being wound or to be wound.

Yet another object of the present invention is to provide suitable structure for guarding the wire being wound upon the bobbin against the whipping action of the wire end terminal.

Still another object of the present invention is to retain the wire wound upon the fully wound bobbin in an orderly array without experiencing any slack or looseness.

The foregoing objects are achieved according to the present invention through the provision of apparatus which has successfully improved upon prior apparatus for the disposition of the terminal end of the wound wire, such apparatus including a wire shifting rod movable between two bobbins in the direction parallel to the rotational axes of the bobbins, a cover attached to the wire shifting rod which serves to cover the fully wound bobbin and which has a slit therein for permitting the entrance therewithin of the wire being wound and a cutter attached to the cover. The portion of the wire disposed adjacent the terminal end and which rotates freely about the fully wound bobbin after the wire being wound is transferred from the vicinity of the fully wound bobbin to the vicinity of the empty bobbin whereupon the wire is then wound thereon, is gradually cut into chips in correspondence to the rotation of such full bobbin, such chips being simultaneously removed from the vicinity of the bobbin without splashing, such cutting or chipping operation continuing until the rotation of the bobbin ceases. Tension required to sever the terminal portion of the wire serves to prevent the occurrence of any slack in the wound wire remaining upon the full bobbin and does not therefore increase the total amount of chips generated. Consequently, the phenomena described above serves to prevent the wire terminal from rendering damage to the other wire portions. A further embodiment of the invention serves to more effectively prevent damage from the whipping action and to provide stable conditions of the wire wound upon the full bobbin wherein the cutter is attached upon the cover and adjacent the wire slit and wherein auxiliary covers are attached to the aforementioned wire shifting rod and an auxiliary wire shifting rod, such covers surrounding the peripheral extent of the slit.

BRIEF DESCRIPTION OF THE DRAWINGS

Various other objects, features and attendant advantages of this invention will be more fully appreciated as the same becomes better understood from the following detailed description when considered in connection with the accompanying drawings, in which like reference characters designate like or corresponding parts throughout the several views and wherein:

FIG. 4 is a cross-sectional view of the protective covers, taken along line 4—4 of FIG. 3.

DETAILED DESCRIPTION OF PREFERRED EMBODIMENTS

Figure 1:
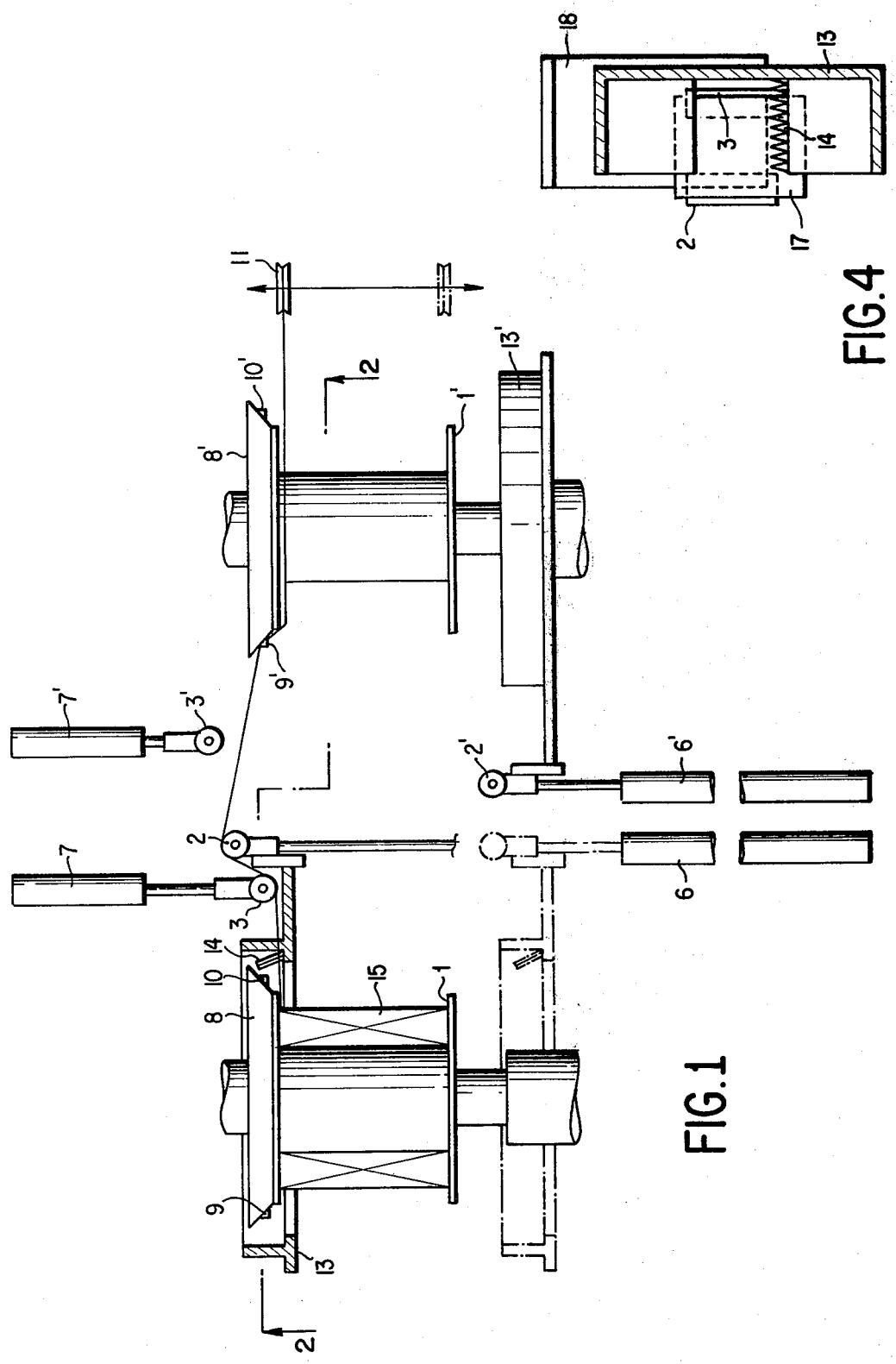
FIG. 1 is a plan view, partly in section, of one embodiment of a wire winding machine apparatus, constructed according to the present invention and showing its cooperative parts.

Referring now to the drawings, and more particularly to FIG. 1 thereof, there is shown one embodiment of the present invention wherein the wire 15 being wound upon the fully wound bobbin 1 is to be transferred therefrom to the empty bobbin 1', such bobbins being rotatably disposed in parallel fashion. In order to facilitate transfer of the wire, a wire shifting rod 2 and an auxiliary wire shifting rod 3, as well as a wire shifting rod 2' and an auxiliary wire shifting rod 3', are respectively provided for and interposed between the pair of bobbins 1 and 1', the rods 2 and 2' and the rods 3 and 3' being extendable and retractable, in opposite directions relative to each other, by means of respective cylinder mechanisms 6 and 6', and 7 and 7'.

Two disks 8 and 8' having claws 9 and 10, and 9' and 10', respectively provided upon their peripheries, are provided to rotate the bobbins 1 and 1' which are detachable from disks 8 and 8'. The wire being wound is alternately transferred between the two bobbins 1 and 1' and accordingly is continuously wound with the aid of the wire shifting rods 2 and 3, and 2' and 3', as well as a guide sheave 11 which is traversable above the bobbins 1 and 1'. With respect to the function of the wire shifting rods 2, 2', 3, and 3', and the guide sheave 11, a detailed description of the same is herein omitted due to the fact that the function of such type or similar components is well known and are for example, fully described in U.S. Pat. No. 3,693,898.

In order to dispose of the wire terminal end within the wire winding machine, suitable covers 13 and 13' are provided for covering the bobbins 1 and 1' and especially those portions of the bobbins which have associated therewith the disks 8 and 8'. The covers have slits 12 provided within a peripheral sector thereof whereby the wire being wound may be conducted to the bobbins, and cutter means 14 for severing the wire when a bobbin is fully wound, and are attached to the wire shifting rods 2 and 2'. As is thus shown in FIG. 1, the cover 13 extends and retracts together with the wire shifting rod 2 and serves to cover both the disk 8 and the associative end of the bobbin 1 while the wire shifting rod is maintained within the extended state which is shown by means of a solid line, the retracted state of the wire shifting rod 2 of course being shown by means of a broken line.

Figure 2:
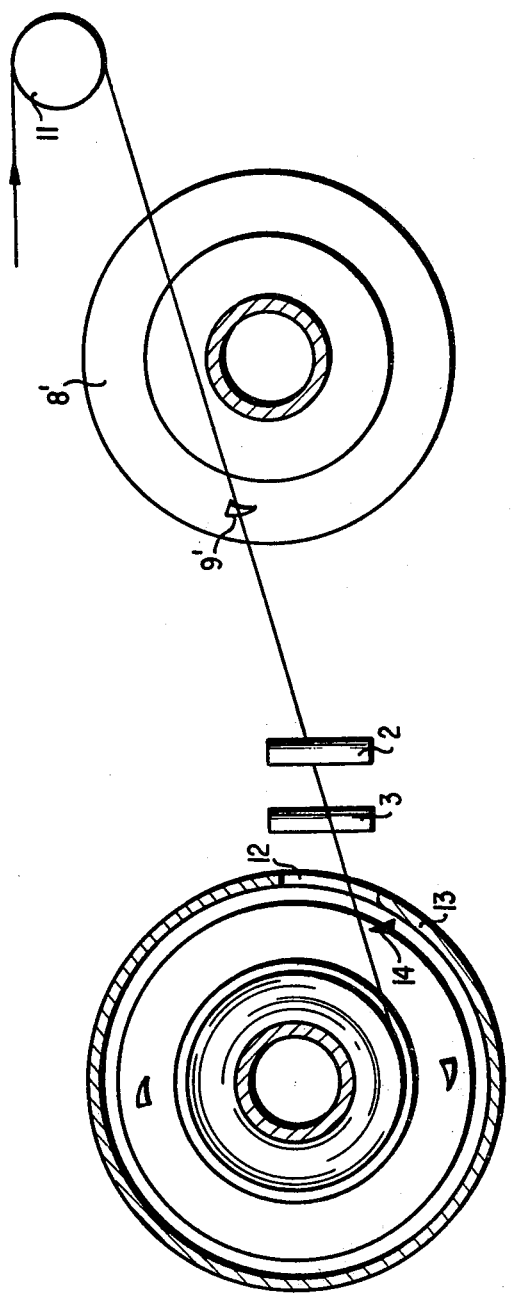
FIG. 2 is a cross-sectional view of the wire winding machine apparatus disclosed in FIG. 1, taken along line 2—2 of FIG. 1.
Figure 3:
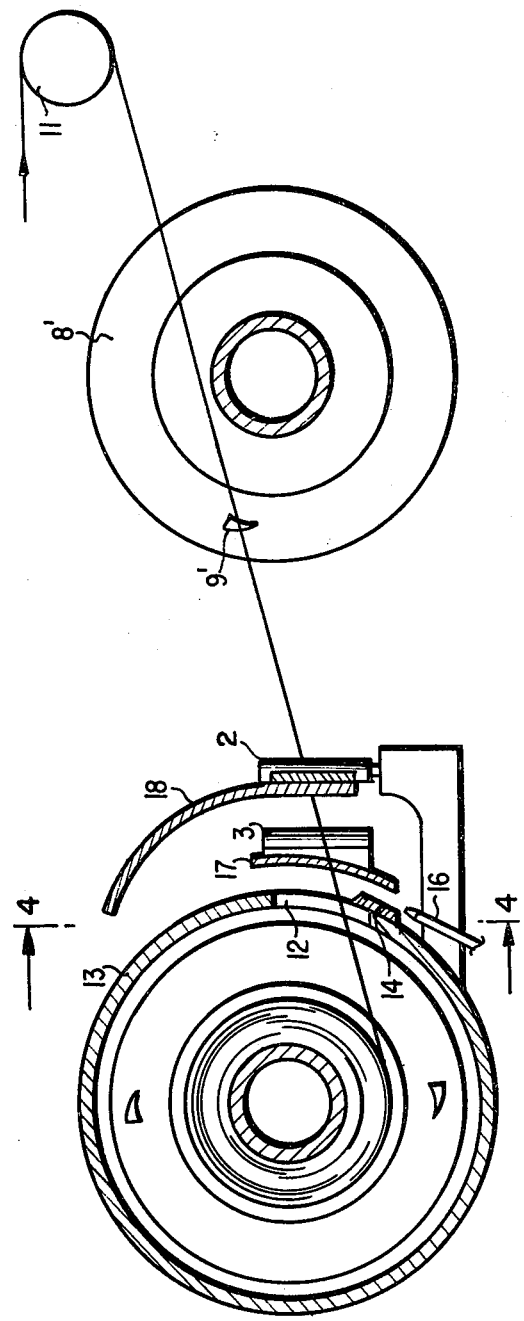
FIG. 3 is a view similar to that of FIG. 2, showing however another embodiment of the apparatus constructed according to the present invention.

As the wire 15 is fully wound upon the bobbin 1, the guide sheave 11 moves to a position adjacent the outer portion of the bobbin 1', by means of actuators well known and not shown, and guides the wire being wound so as to pass about the bobbin 1', the relative pertinent location of the guide sheave 11 being indicated by means of a solid line in FIGS. 1, 2 and 3. After the guide sheave 11 has been positioned in the above-mentioned manner, the wire being wound upon bobbin 1 begins to be transferred from the vicinity of bobbin 1' due to the fact that the claw 9' upon the disk 8' catches the wire within its flow path, the wire being simultaneously cut by means of claw 9' at peripheral portion thereof as a result of the actuation of cylinders 6 and 7 which serve to extend the wire shifting rod 2 and the auxiliary wire shifting rod 3 in opposite directions, rod 3, as best seen in FIG. 1, and in conjunction with FIG. 3, at such time maintaining the wire wound upon full bobbin 1 away from the plane of claws 9 and 10 of bobbin 1.

Accordingly, the wire, one new terminal end of which has been caught by means of the claw 9', begins to be wound upon the bobbin 1' while another new terminal of which is cut off by means of the claw 9' begins to rotate freely around the fully wound bobbin 1. The terminal part of the wire rotating freely around the fully wound bobbin 1 is subsequently cut by means of the cutter 14 and is removed in a manner similar to chips which consequently do not splash for the same are retained or confined by means of the cover 13. In this manner, the wire wound upon the bobbin 1 and being wound upon the bobbin 1' are protected from damage caused by the whipping action of the wire terminal end portions as well as the splashing of the chips. Similarly, after the removal of the terminal portion of the wire wound upon full bobbin 1 by means of cutter 14, such terminal portion extending outwardly of cover 13 and between cutter 14 and claw 9', the wire upon full bobbin 1 will also subsequently tend to move radially outwardly and whip around the bobbin 1 due to centrifugal force impressed thereon as a result of the continued rotation of the bobbin prior to stopping and removing the same from the winding apparatus, and as the terminal or end portion of such whipped wire encounters cutter 14 upon every successive revolution, additional chips of such wire will be generated by means of cutter 14.

Referring now to FIGS. 3 and 4, a second embodiment of the present invention is disclosed wherein the cutter 14 is disposed upon one side of the slit 12, which permits entrance of the wire being wound into the vicinity of the bobbin, the edge of which has a zigzag configuration so as to simulate a saw. In addition, an air nozzle 16 is disposed adjacent the cutter 14 so as to dispose of the chips of wire cut by means of the cutter 14. An auxiliary cover 17 is further provided so as to cover the peripheral extent of the slit 12, and is attached to the auxiliary wire shifting rod 3 while a partial cover 18, attached to the wire shifting rod 2, is similarly provided about the peripheral extent of the auxiliary cover 17.

In operation, the terminal end of the wire wound upon the fully wound bobbin 1 rotates freely after the wire has been severed by means of the claw 9'. The portion of such terminal portion of the wire disposed over the slit 12 comes into contact with the cutter 14 due to the rotation of the bobbin 1 whereupon generated chips of the wire are disposed of, and guided, by means of the air nozzle 16, and the covers 17 and 18, respectively. As more specifically shown in FIG. 4, the partial cover 18 surrounds the auxiliary cover 17 which is located just in front of the slit 12 of the cover 13, and as the peripheral extent of cover 18 is greater than that of the auxiliary cover 17, the wires already wound upon bobbin 1 and being wound upon bobbin 1' are protected from damage normally caused by splashing and sticking of the wire chips. It is of course noted that the covers 13, 17 and 18 disposed at the particular noted locations do not interfere with the flow path of the wire being transferred because the covers 13 and 18 move together with the wire shifting rod 2 while the auxiliary cover 17 moves together with the auxiliary wire shifting rod 3.

Thus it may be seen that the present invention provides effective advantages over prior art wire winding apparatus due to the fact that no damage occurs as a result of the free rotation of the wire end wire terminal, the wire wound upon the fully wound bobbin is maintained thereon without the occurrence of any slack or looseness, and the wire chips severed by means of the cutter device do not present any problems, such as for example, splashing and sticking upon the wire wound. In addition, the winding operation is not interfered with by so disposing of the wire terminal ends and consequently, continuous and uninterrupted operation is facilitated.

Obviously, many changes and modifications of the present invention are possible in light of the above teachings. It is to be understood therefore, that within the scope of the appended claims, the invention may be practiced otherwise than as specifically described herein.

What is claimed as new and desired to be secured by Letters Patent of the United States is:

1. Apparatus for disposing of a wire end terminal within a wire winding machine which continuously winds a wire by alternately utilizing two bobbins rotatably disposed in parallel fashion and having a plurality of wire shifting rods interposed between said bobbins, comprising:

said wire shifting rods being extendable and retractable in a direction parallel to the rotational axes of said bobbins;

cover means for each of said bobbins for covering one end of each of said bobbins which is attached to one of said wire shifting rods and which has a slit means provided therein for permitting said wire being wound to enter the vicinity of said bobbin being wound; and a cutter attached to each of said cover means for cutting said wire end terminal into chips.

2. Apparatus for disposing of a wire end terminal within a wire winding machine as set forth in claim 1, wherein each said cutter is disposed within its respective cover means.

3. Apparatus for disposing of a wire end terminal within a wire winding machine as set forth in claim 1, wherein each said cutter is disposed upon one side of said slit means in its respective cover means.

4. Apparatus for disposing of a wire end terminal within a wire winding machine as set forth in claim 1, wherein an air nozzle is provided near each of said cutters for disposing of said chips.

5. Apparatus for disposing of a wire end terminal within a wire winding machine as set forth in claim 1, wherein an auxiliary cover, attached to an auxiliary wire shifting rod, is disposed within the vicinity of each said slit means for guiding said chips when said chips are being disposed of.

6. Apparatus for disposing of a wire end terminal within a wire winding machine as set forth in claim 5, wherein a partial cover attached to said one of said wire shifting rods is disposed within the vicinity of each said auxiliary cover so as to further guide said chips during disposal thereof.

7. Apparatus for disposing of a wire end terminal within a wire winding machine as set forth in claim 1, wherein the edge of each said cutter has a zigzag configuration.

* * * * *